(12) United States Patent
Ambrose et al.

(10) Patent No.: US 7,248,687 B2
(45) Date of Patent: Jul. 24, 2007

(54) SYSTEM AND METHOD FOR CALL DIALING AND CALL INFORMATION COLLECTION

(75) Inventors: Mark Ambrose, Maplewood, NJ (US); Rich Clow, Summit, NJ (US); Rich Feight, Sioux Falls, SD (US); Jim L. Muir, Hartford, SD (US)

(73) Assignee: Citicorp Credit Services, Inc., Long Island City, NY (US)

( * ) Notice: Subject to any disclaimer, the term of this patent is extended or adjusted under 35 U.S.C. 154(b) by 0 days.

(21) Appl. No.: 11/005,641

(22) Filed: Dec. 6, 2004

(65) Prior Publication Data

US 2005/0220290 A1 Oct. 6, 2005

Related U.S. Application Data

(60) Provisional application No. 60/526,999, filed on Dec. 5, 2003.

(51) Int. Cl.
*H04M 3/00* (2006.01)
(52) U.S. Cl. ................. 379/265.06; 379/88.25
(58) Field of Classification Search .......... 379/215.01, 379/216.07, 265.06, 265.02, 265.03, 265.11, 379/265.12, 266.1, 88.25
See application file for complete search history.

(56) References Cited

U.S. PATENT DOCUMENTS

| | | | |
|---|---|---|---|
| 6,603,854 B1 * | 8/2003 | Judkins et al. | 379/265.06 |
| 6,708,039 B2 * | 3/2004 | Harder | 455/466 |
| 6,766,012 B1 * | 7/2004 | Crossley | 379/265.02 |
| 2005/0128961 A1 * | 6/2005 | Miloslavsky et al. | 370/270 |

* cited by examiner

*Primary Examiner*—Creighton Smith
(74) *Attorney, Agent, or Firm*—George T. Marcou; Kilpatrick Stockton LLP

(57) ABSTRACT

A method and system for outbound dialing of contacts and collecting call information in which one or more customers are allowed to submit records from the customers' mainframes for a plurality of contacts to be called for the customers via a dialing mode of a hosted software system for sending event-driven alert messages. Based on the records submitted by the customers, the dialing mode of the hosted software system initiates calls to the contacts, and when and if a right-party contact is reached for a particular customer, the call is delivered from the dialing mode to an agent at one of a plurality of call centers of the particular customer according to predefined agent selection rules for outbound call routing. In addition, data regarding the call to the contact is collected.

26 Claims, 10 Drawing Sheets

1. Centralized Inventory for NDM and Site Ops

Activity
- Account streams (IBS, FDR, SM10)
- PMU Decision support applied
- BTTC data enrichment
- Segmentation
- Site application of strategies by portfolio
- NDM file to PAR3

Pros
- Centralized function
- Business rules driven task list
- Single delivery of payload
- Site fail over capability

Cons
- No local control

2. Work Day Activity

Activity
- List selection
- Apply agent resources
- Tune throughout day using site tools

Pros
- Common tool set to tune for all sites
- Hosted solution provides access to other sites (backup)
- Real time enterprise reporting (intra-day)

Cons
- Actual versus perceived transfer latency

3. End of Day Activity

Activity
- Call disposition
- Data delivery

Pros
- Performed by centralized group
- No data aggregation required
- No data transformation required

Cons
- None

Figure 1(a)
PRIOR ART

Inventory for NDM (1)

Activities
- Account streams (IBS, FDR, SM10)
- PMU Decision support applied
- Delivered to Site ops by portfolio

Pros
- Centralized function for each processor stream

Cons
- Requires multiple delivered payloads equal to number of sites

Local Site Ops (2)

Activities
- NDM file receipt
- BTTC data enrichment
- Segmentation
- Site application of strategies by portfolio
- Segment by dialer and site rules
- Data transformation from NDM to local dialer file formats

Pros
- Local control

Cons
- Requires an operating group per location
- Time consuming
- No fail over capability if local operator unavailable
- Redundant work due to multiple dialer types

Work Day Activity (3)

Activities
- List selection
- Apply agent resources
- Tune throughout day using site and dialer specific tools

Pros
- Real time control using dialer tools to tune and adjust

Cons
- Requires dialer specific operators per location
- Inconsistent tool sets per dialer
- Inconsistent tuning performance
- Site/Dialer operator single point of failure
- No enterprise reporting intr-day

End of Day Activity (4)

Activities
- Call disposition
- Data Aggregation
- Data transformation
- Data delivery

Pros
- None

Cons
- Complex and time consuming
- Processing intensive
- Transformation loses details
- Requires specialized personnel per location

SYSTEM AND METHOD FOR CALL DIALING AND CALL INFORMATION COLLECTION

PRIORITY APPLICATION

This application claims the benefit of U.S. Provisional Application No. 60/526,999 filed Dec. 5, 2003, entitled "SYSTEM AND METHOD FOR CALL DIALING AND CALL INFORMATION COLLECTION", which is incorporated herein by this reference.

FIELD OF THE INVENTION

The present invention relates generally to call handling systems and methods, and particularly to methods and systems for centralizing and completing outgoing calls and reporting call data in a streamlined process.

BACKGROUND

Currently, the leading dialer vendors' financial performance is deteriorating. This deterioration increases the risk of losing financial viability and support; limits the vendors' investment in new product features and functionality, thus requiring more customization; and requires ongoing risk assessment and contingency planning efforts by their customers. Current technology includes: proprietary predictive dialing hardware and software; standardized chip sets for supporting call progress detection for most dialing platforms; and software-driven pacing algorithms and list management for power and predictive dialing. Current dialer techniques for managing customers' diverse portfolios, i.e., by location, constrain flexibility and performance potential because collectors are limited to work on specific dialers, lists and strategies; dialer managers are required at every site to load, configure and refine daily inventory; and site infrastructure is capacitized for peak load, but only utilized for brief spikes.

In a particular example of the implementation of current systems, dialer vendors go through the generalized process of (1) inventorying the network data mover ("NDM") of their customer(s), (2) sending the NDM files to local sites for processing according to local controls, (3) applying agent resources to the processed files and constantly tuning and adjusting according to site and dialer specific tools and (4) aggregating, transforming and delivering call disposition information to the customer(s) from the individual local sites. As is depicted in the "cons" of FIG. 1(a), these process steps are not efficient as an outbound dialing solution for customers having diverse portfolios with multiple locales. Optimizing telephone carrier charges is also possible by centralizing call generation in a few sites that represent the best rates, taxes and tariffs instead of being regulated at 10-20 sites with various carriers and fee structures.

Further to this particular example, referring to FIG. 1(b), according to the current system and process, a complex matrix of steps, locales, and service providers with proprietary software and hardware describes the call processing for a customer having a diverse calling portfolio. As shown in FIG. 1(b), different calls must be routed from/to different sites, i.e., site #1, site #2, site #3 from different carriers and data processing entities. Further still, within each site, there may be multiple configurations and dialers, thus contributing to the inefficiencies of the current system. This system requires complex maintenance, constrains sharing of work and "best practices" as between different sites and different dialers. For example, the current system and process limit the efficiency of a customer's outbound dialing to connect to callers who are targeted for collections, telemarketing, and the like based upon the fact that proprietary hardware and software is required at either a call center or site-by-site basis.

Depending on the particular call center and/or site, individual customers and/or call center staff can only connect to and through the designated proprietary hardware and software for that call center or site, thereby limiting the amount of work the staff can do and constraining the amount of work that can be shared across the customer's entire enterprise. As such, there is a need in the art for a centralized process for outbound calling and call data collection that removes such restraints. The number of collections treatments that can be used cost efficiently is expanding, and these cannot be done at all sites. Collections treatments include, but are not limited to: call with IVR-like prompts for identification and past due payment, call with IVR-like prompts for "screening" (e.g. to confirm the right party) then select automated or personal response, call progress detection determines live answer and immediately transfers to an agent (same as predictive dialer). Combining these treatments offered on a single, centralized platform enables higher rates of contact at the lowest cost required.

SUMMARY OF THE INVENTION

It is a feature and advantage of the present invention to provide a method and system for outbound dialing of contacts and call information collection that streamlines and centralizes the process of performing calls and acquiring call data.

It is another feature and advantage of the present invention to provide a method and system for outbound dialing of contacts and call information collection in which call data is not subject to local rules or platforms, thus eliminating any requirement for customized software and agent control for each call center.

It is a further feature and advantage of the present invention to provide a method and system for outbound dialing of contacts and call information collection in which all calls are formatted according to a common set of rules and functionality, thereby eliminating any need for call data for various locales to go though multiple steps of formatting, reformatting, and aggregation prior to delivery to the customer.

To achieve the stated and other features, advantages and objects, embodiments of the present invention utilize, for example, computer hardware, operating systems, programming languages, software applications, and other technology to provide a method and system for outbound dialing of contacts, in which one or more customers are allowed to submit records from the customers' mainframes for a plurality of contacts to be called for the customers via a dialing mode of a hosted software system for sending event-driven alert messages. Based on the records submitted by the customers, the dialing mode of the hosted software system initiates calls to the contacts, and when and if a right-party contact is reached for a particular customer, the call is delivered from the dialing mode to an agent at one of a plurality of call centers of the customer according to pre-defined agent selection rules for outbound call routing. In addition, data regarding the call to the contact is collected.

In an aspect of the invention, the customer records are submitted on a predetermined periodic basis and include, for example, collection records and/or telemarketing records. In another aspect of the invention, the records can include one or more of tags, treatments, and/or target segments of the contacts to be called and/or a time of day to call the contacts. In an embodiment of the invention, initiating calls by the dialing mode of the hosted software system involves routing calling instructions for the calls to a peripheral gateway by a contact manager and initiating the calls by the peripheral gateway through a telephony server of the hosted software system, such as through an integrated services digital network utilizing B/D signaling via an access tandem switch and a public switched telephone network by the peripheral gateway.

In an embodiment of the invention, delivering the call to the agent involves, for example, selecting a routing script by a contact manager based on information in the number field dialed by the dialing mode. The routing script examines a longest available agent at all of the customer's call centers and determines a target vector directory number, and an intelligent call router selects a free temporary vector directory number at one of the call centers from a pool of vector directory numbers and returns information about the free temporary vector directory number to an interactive voice response system. The contact manager determines a target agent for the call and sends the call to a programmable device at the call center for routing incoming calls to target agents within the particular call center, for example, to an automatic call distributor associated with the target agent, which routes the call to the target agent as determined by an intelligent response platform.

Other aspects of the invention involve providing call-event and profile information to a target agent desktop by the contact manager and connecting the call to the agent for a two-way conversation with the right-party contact, whereupon a trunk line release of a port used to initiate the right-party contact is initiated for use in a succeeding call by the dialing mode without disturbing the connection between the right-party contact and the agent. In a further aspect of the invention, the call is delivered to the agent according to predefined agent selection rules for outbound call routing which can be combined with pre-defined agent selection rules based at least in part on agent availability and agent skills for inbound call routing.

In an embodiment of the invention, collecting the call data involves, for example, collecting call disposition data for presentation to the customer and providing call-data back to the customer at the end of a predetermined interval. In this regard, information consisting at least partly of a type of call made, an identification of the right-party contact, and skills of the agent is saved. Additional aspects of the invention include, for example, formatting and/or inventorying the records of the contacts to be called via the dialing mode according to a common set of rules and functionality by the hosted software system and/or inventorying the records of the contacts to be called via the dialing mode. Still further aspects of the invention involve initiating and monitoring calls to contacts at predetermined periodic intervals via the dialing mode, for example, a pacing algorithm.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWING

FIG. 1(*b*) shows the prior art process flow between components of the calling system for placing calls and delivering collected call data;

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to an embodiment of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 1B:
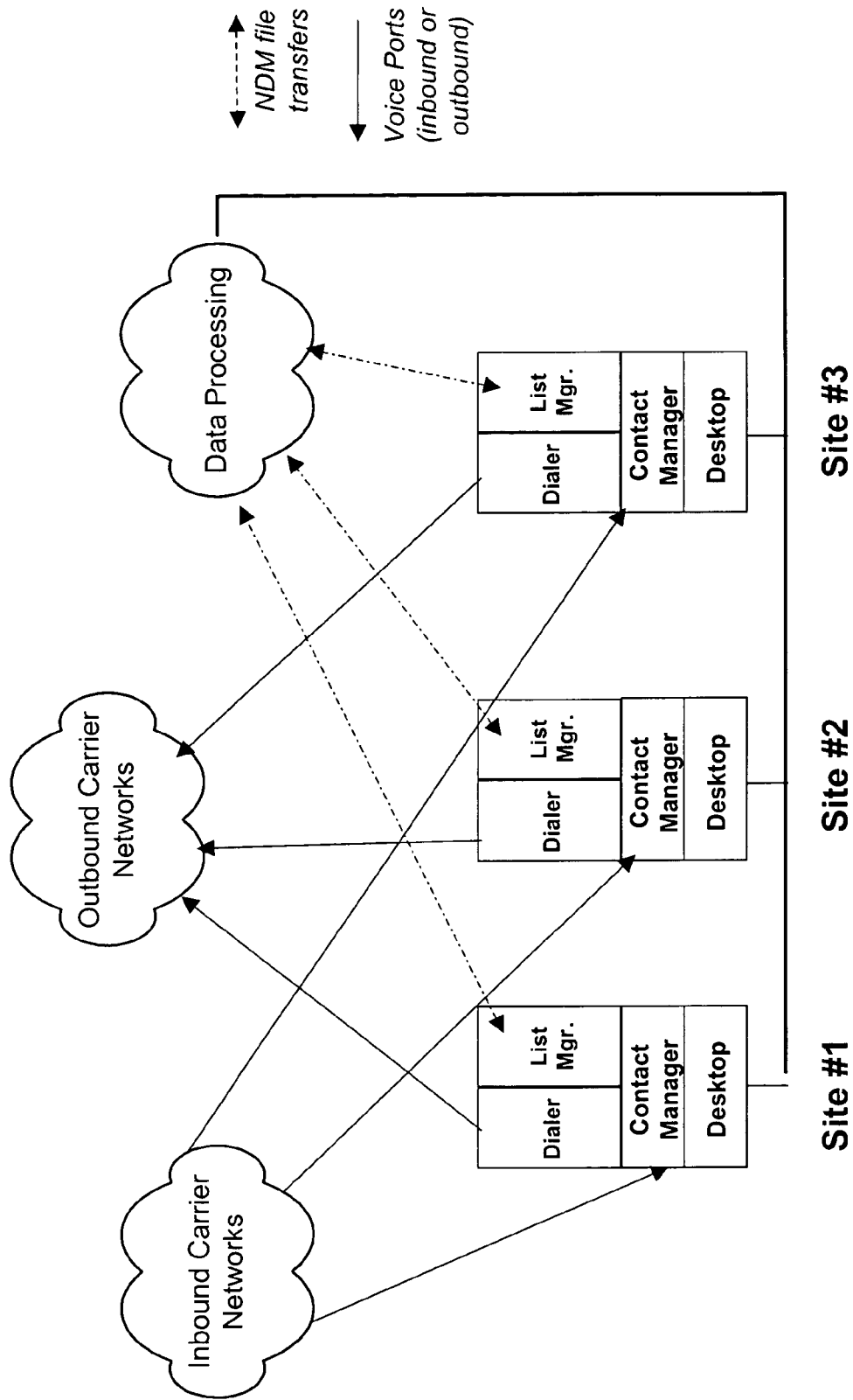
FIG. 1(*a*) shows the generalized prior art process for placing calls and delivering collected call data.
Figure 2:
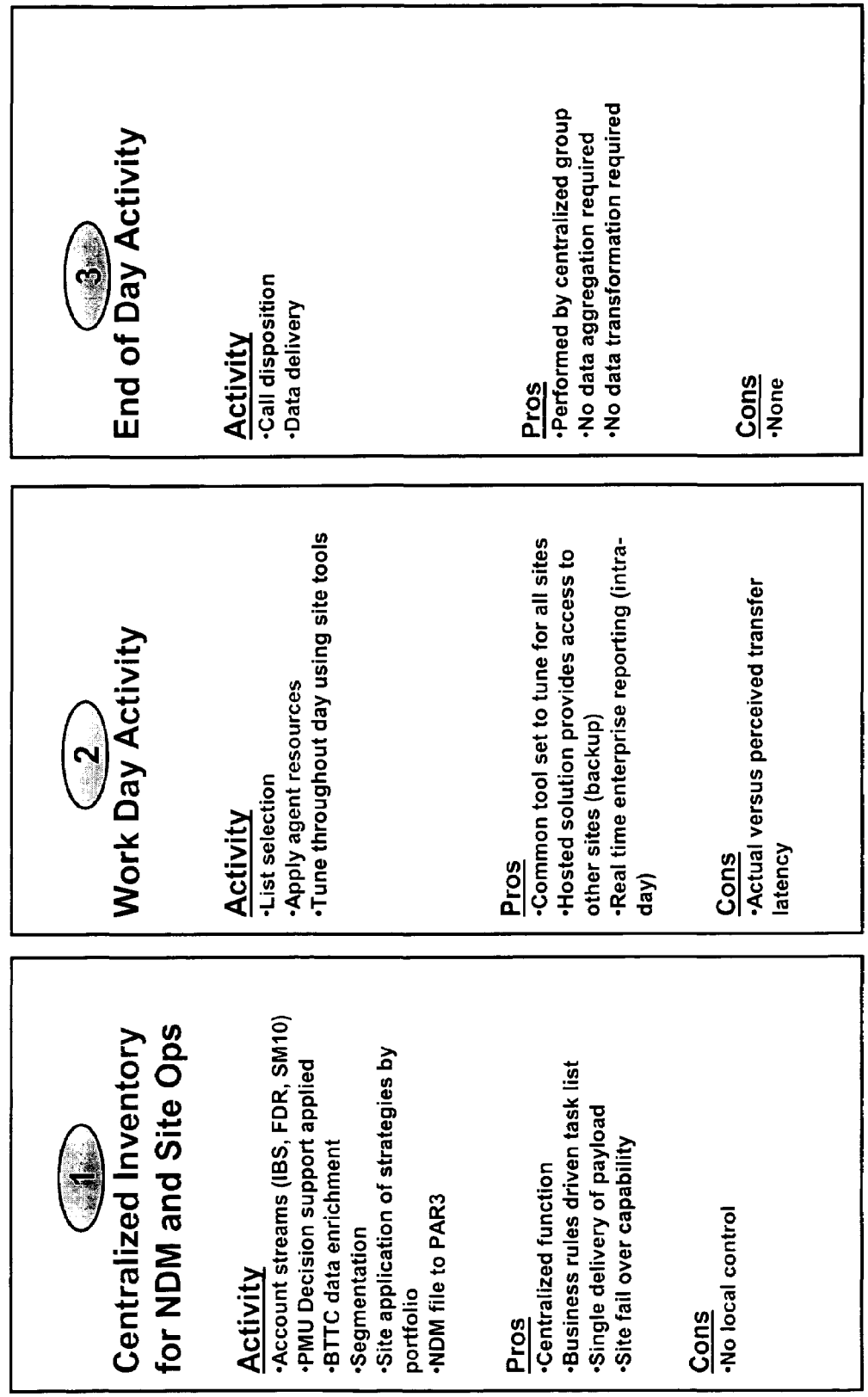
FIG. 2 shows an example of a process for placing calls and delivering collected call data according to an embodiment of the present invention.

Referring to FIG. 2, an embodiment of the present invention provides a process for outbound dialing wherein the process for performing calls and acquiring call data for customers is streamlined and centralized. According to this process embodiment, call data is not subject to local rules or platforms, thus requiring customized software and agent control for each locale. Instead, all calls are formatted according to a common set of rules and functionality. Thus, call data for various locales does not need to go though multiple steps of formatting and reformatting and then aggregating prior to delivery to the customer.

As shown in FIG. 2, according to an embodiment of the present invention, the process for outbound dialing includes (1) inventorying NDM files for the customer and applying centralized, common strategies according to segmented portfolios; (2) application of universal treatments with enterprise resources to NDM files and universal tuning; and (3) centralized delivery of call disposition data in universal format based upon routing rules such as availability and skill to a single desktop application agents at any call center.

Figure 3:
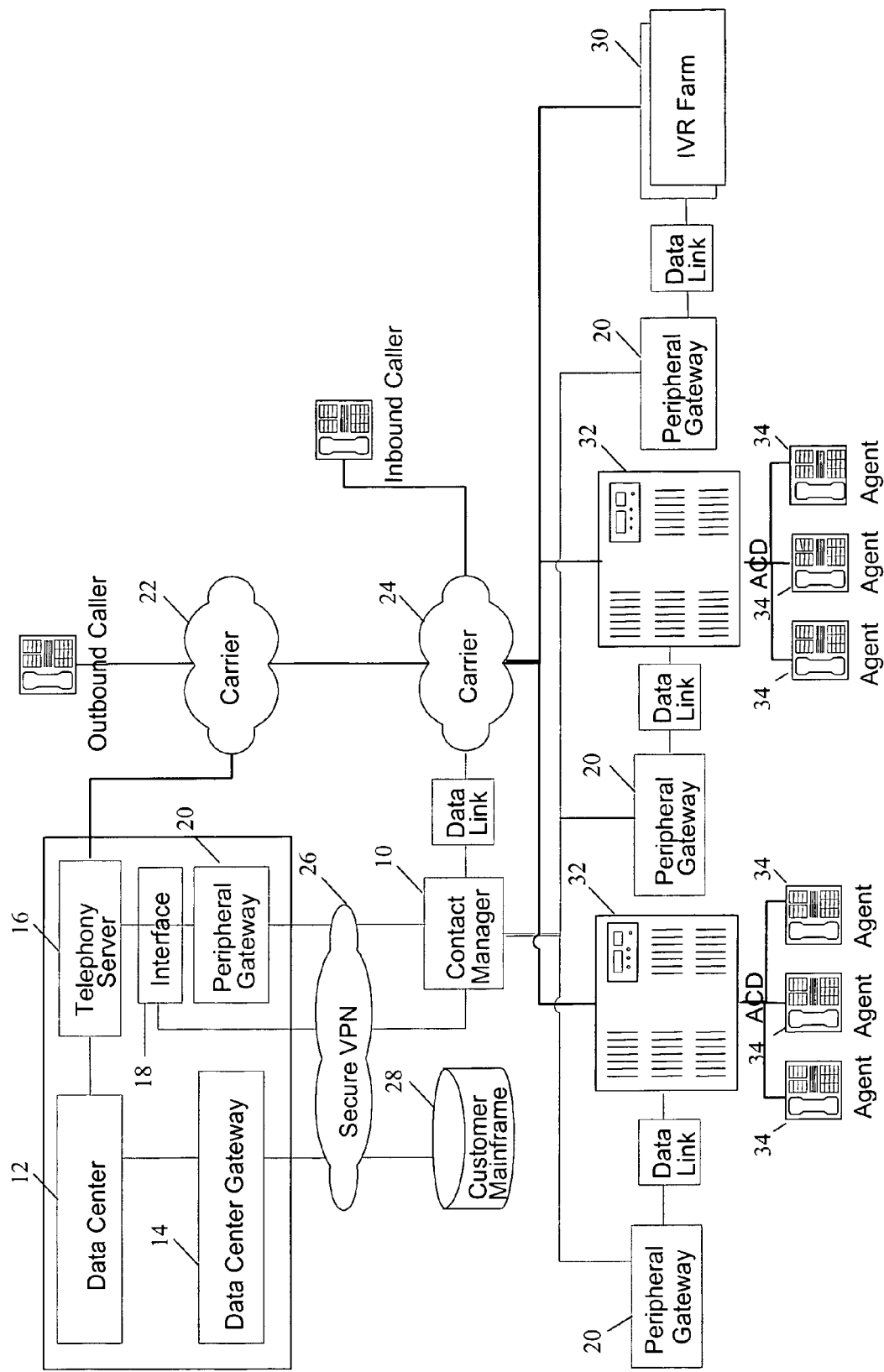
FIG. 3 shows an example of a network architecture for placing calls and delivering collected call data according to an embodiment of the present invention.
Figure 4A:
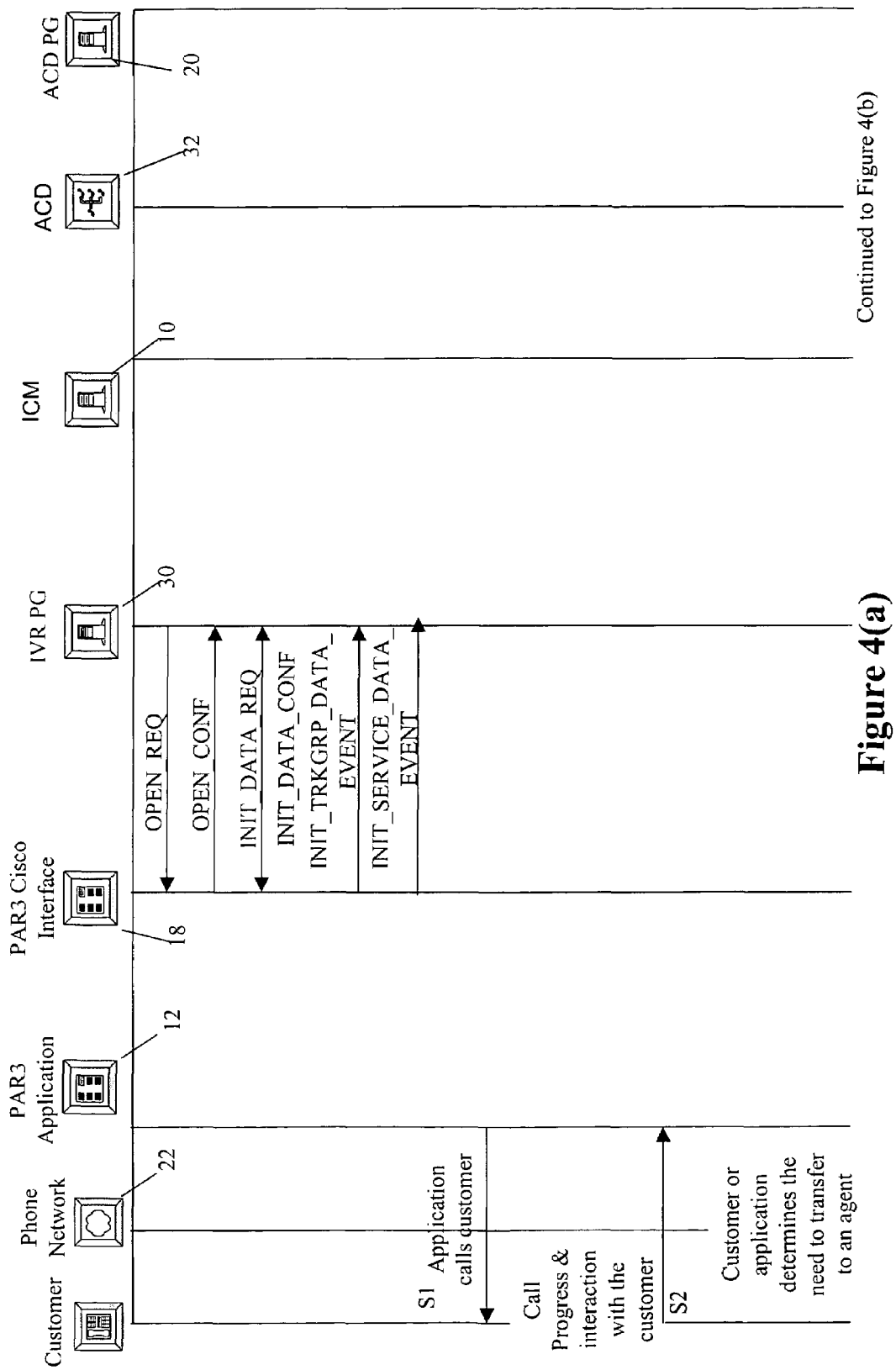
FIGS. 4(*a*) through 4(*e*) show an example of a process flow between components of the network architecture of FIG. 3 for placing calls and delivering collected call data for an embodiment of the present invention.
Figure 4B:
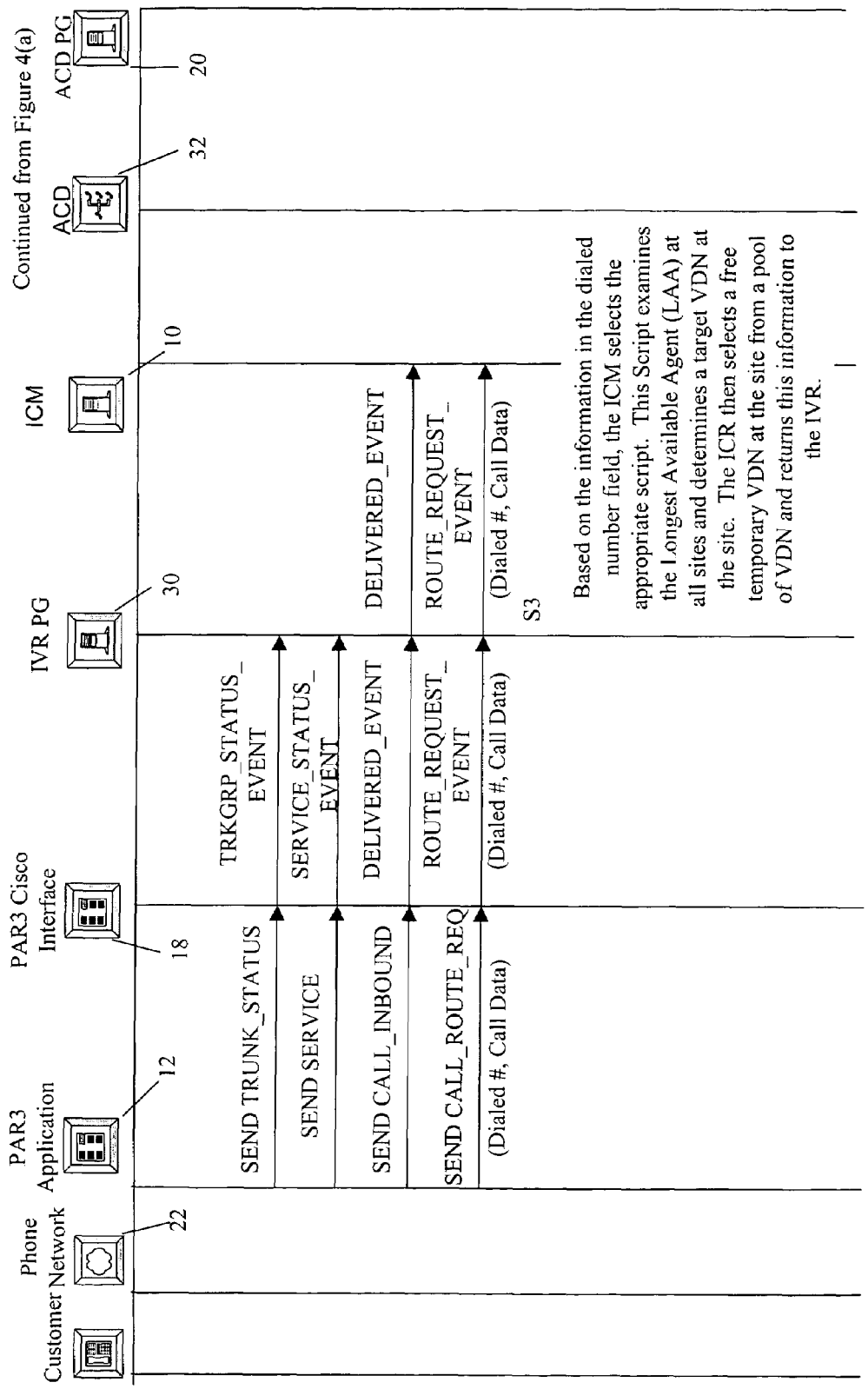
Figure 4C:
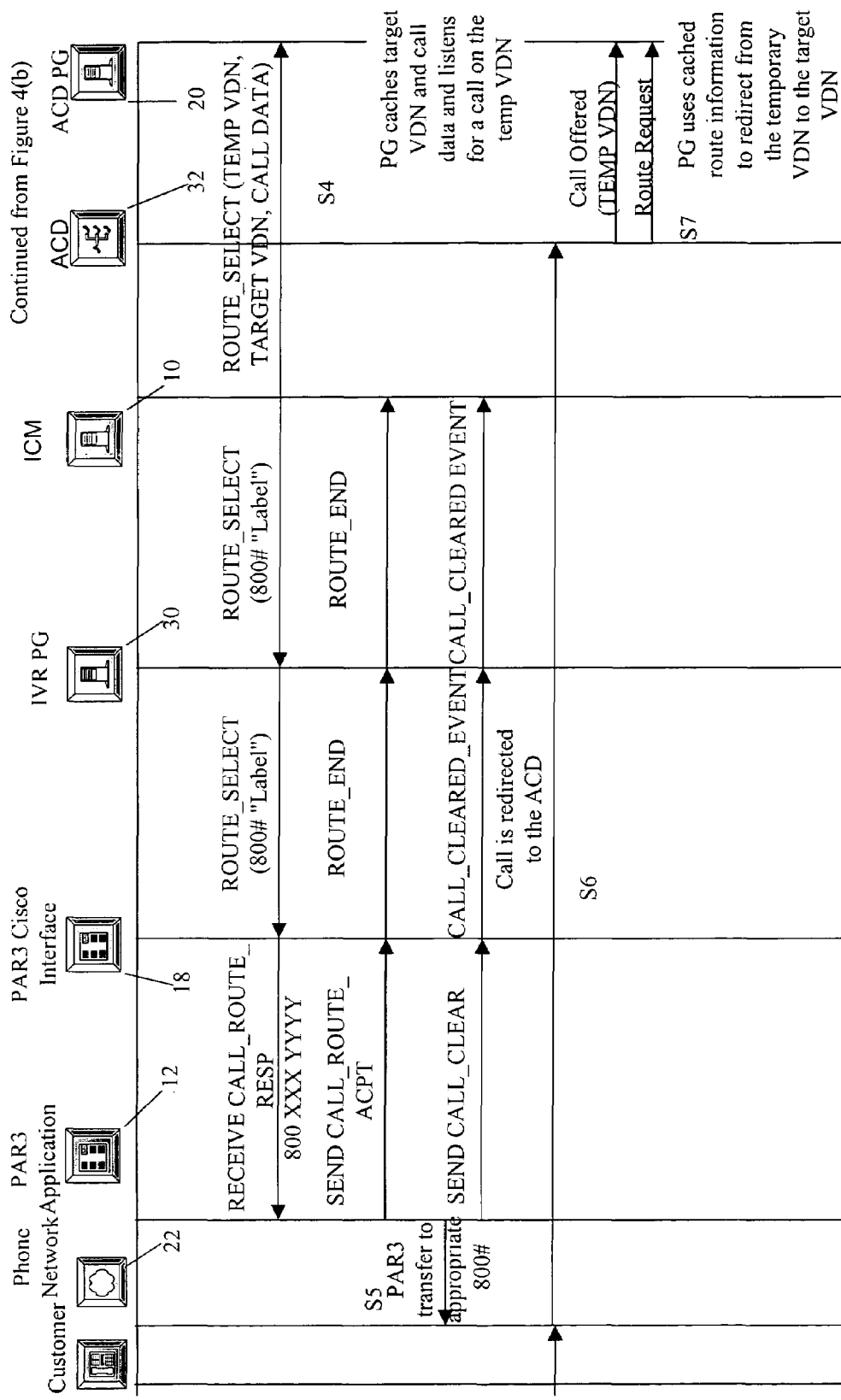
Figure 4D:
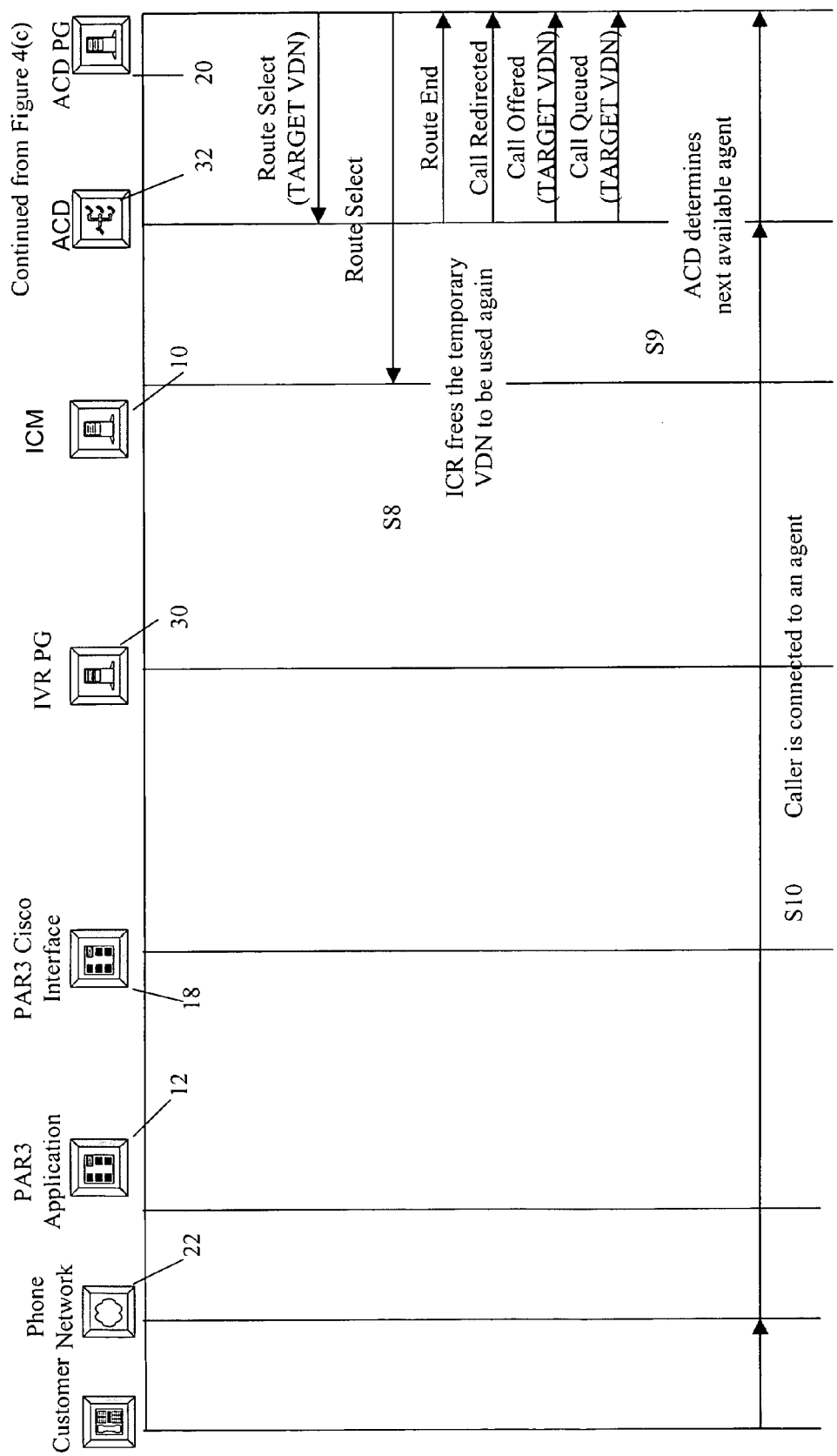
Figure 4E:
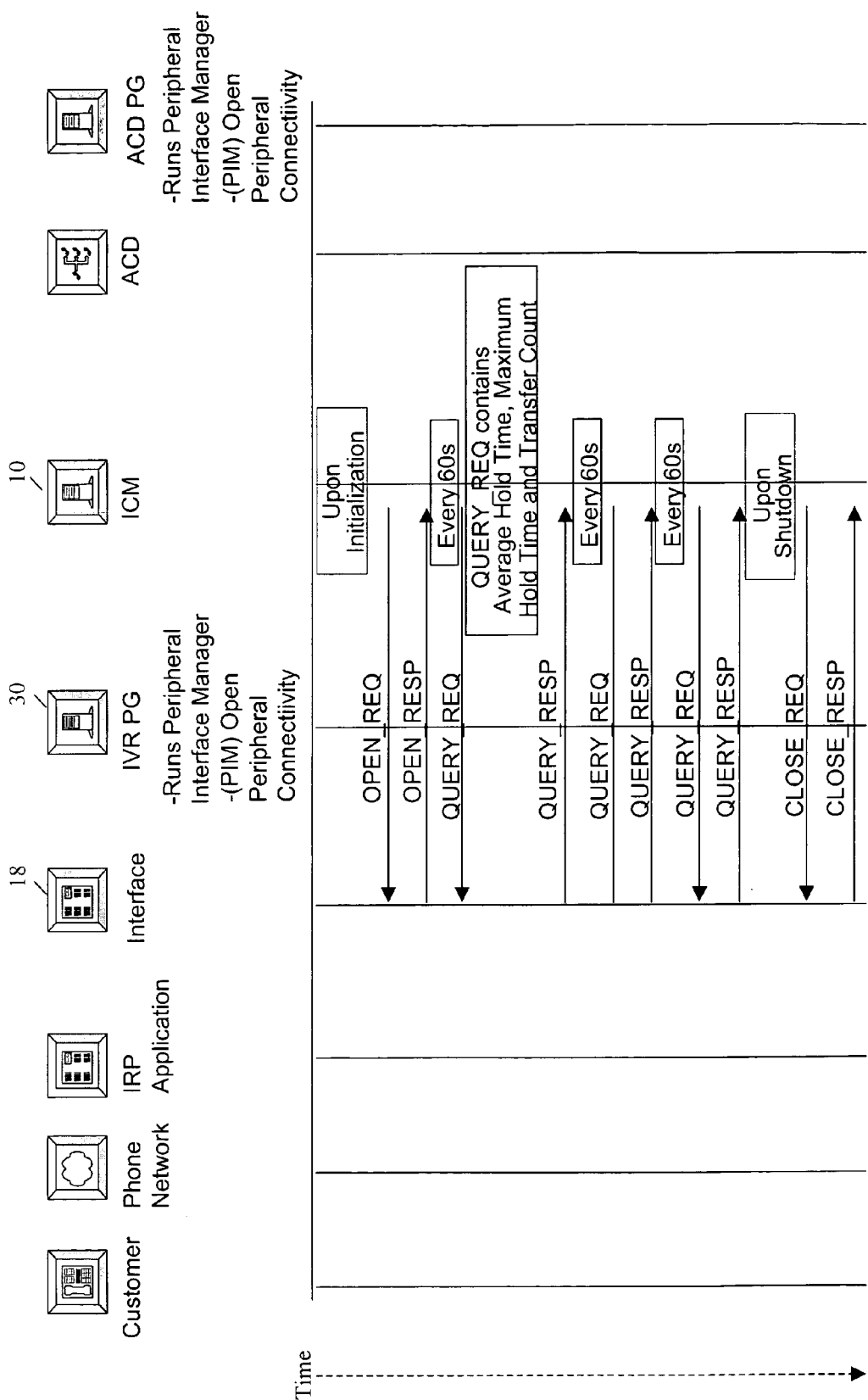

FIG. 3 shows the network architecture according an embodiment of the present invention for implementing the dialing process of FIG. 2. In a particular embodiment, network components such as the contact manager 10 may represent a component solution provided by a first source, such as Cisco's Integrated Contact Management (ICM) system and software platform. Cisco's ICM platform helps manage voice and data distribution across enterprise networks and offers an integrated suite of intelligent contact management capabilities that support customer interaction via telephone, Web, fax, and e-mail across a heterogeneous network of automatic call distributor ("ACD"), private branch exchange ("PBX"), interactive voice response ("IVR"), database, and desktop applications. Custom integration will define the role that PAR3's intelligent response platform (IRP) functionality (similar to IVR) plays in coordination with the other solution within the network (e.g. transfer to USAN voice response unit (VRU) (IVR) for payment processing). The Cisco ICM platform also enables the customer to deploy a complete network-to-desktop CTI strategy by providing call-event and customer-profile information to a targeted agent desktop. A description of the exemplary Cisco ICM solution is found at http://www.cisco.com/warp/public/180/prod_plat/cust_cont/icm, pages 1-4, which is incorporated herein by reference in its entirety.

Further to FIG. 3, the contact manager 10, such as Cisco's ICM solution, is integrated with other components such as the data center 12, the data center gateway 14, the telephony server 16 and the interface 18 which may be provided by the same or a second source. For example, PAR3 Communications ("PAR3") provides a hosted software system to send event-driven alert messages. PAR3's XML-based intelligence Response Platform ("IRP") is an alert-and-response system, offered as a managed application service provider ("ASP") model, that is designed to actively involve customers in the communications process by providing a means for a company to provide its customers with notifications via telephone, e-mail, pager, Internet, fax or wireless device. It also lets customers choose how, when and where they receive information. The PAR3 platform is driven by the PAR3 XTAP Gateway, an open, XML-based technology component that integrates with enterprise data systems such as relational database systems, CRM systems, client/server systems, HTTP servers, mainframe systems and legacy systems. As PAR3 is an extension of a company's existing systems, it can mine detailed customer information and send timely, relevant alerts with detailed customer data from a company's existing systems.

By way of example, the contact manager 10 initiates a check of administrative script parameters such as AHT=average handle time, CallinQnow, etc. and sets global variables before routing calling instructions to a peripheral gateway 20. The peripheral gateway 20 initiates calls through the telephony server 16, e.g., 96 port integrated services digital network ("ISDN") utilizing B/D signaling via DMS-250, and a public switched telephone network ("PSTN"). A description of the exemplary PAR3 IRP is found at http://www.par3.com/sales/PAR3_FactsFeatures.pdf, pages 1-4, which is incorporated herein by reference in its entirety.

Also shown in FIG. 3 are the carriers 22, 24, e.g., telephone service providers, such as MCI, regional bell operating companies (RBOC), and the like; a secure virtual private network ("VPN") 26 through which the customer's mainframe 28 and the contact manager 10 communicate with the data center gateway 14 and the interface 18; a hosted IVR solution 30, representative ACDs 32, agent terminals 34 and peripheral gateways 20. Additional components for use in a network architecture according to an embodiment of the present invention are described in U.S. patent application Ser. No. 09/558,174 entitled "System and Method for Automated Telephone Message Routing Using an Altered ANI" which is incorporated herein by reference in its entirety. One skilled in the art recognizes that the components forming the network architectures described herein are merely exemplary. The functionality of the components may be performed by substituting other equivalent components.

FIGS. 4(a) through 4(e) show an embodiment of the message flow and integration between the components of FIG. 3 in order of occurrence, starting with time (T)=0. The individual identified components and related processes shown in FIG. 3 are understood by those skilled in the art and are defined as follows:

Automatic Call Distributor (ACD) 32—A programmable device at a call center that routes incoming calls to targets within that call center. After the ICM determines the target for a call, the call is sent to the ACD 32 associated with that target. The ACD 32 must then complete the routing as determined by the IRP.

Peripheral Gateway (PG) 20—The computer and process that communicates directly with the ACD, PBX, or VRU at the call center. The peripheral gateway 20 reads status information from the peripheral and sends it to a central controller. In a private network configuration, the Peripheral Gateway sends routing requests to the Central Controller and receives routing information in return.

Peripheral Interface Manager (PIM)—that part of the peripheral gateway 20 software that communicates directly with a peripheral.

Vector Directory Number (VDN)—An extension number used in the ACD 32 software to connect calls to a vector for processing. The VDN by itself may be dialed to access the vector from any extension connected to the switch.

Vector—A list of steps that the process calls in a user-defined manner. The steps in a vector can send calls to splits, play announcements and music, disconnect calls, give calls a busy signal, or route calls to other destinations.

Referring further to FIGS. 4(a) through 4(e), at S1, the dialing mode 12 dials up a contact for a customer; the call progresses to an interaction with the contact; and at S2, a determination is made to transfer the contact to an agent. At S3, based on information in the dialed number field, the contact manager 10 selects an appropriate script, which examines the longest available agent (LAA) at all sites and determines a target VDN at the site, and an intelligent call router aspect then selects a free temporary VDN at the site from a pool of VDN's and returns this information to the IVR 30. At S4, the ACD peripheral gateway 20 caches the target VDN and call data and listens for a call on the temporary VDN. At S5, the call is transferred, for example, to an appropriate 800 number, and at S6, the call is redirected to the ACD 32. At S7, the ACD peripheral gateway 20 uses cached route information to redirect the call from the temporary VDN to the target VDN; at S8, the intelligent call router aspect frees the temporary VDN to be used again; at S9, the ACD 32 determines the next available agent; and at S10, the contact is connect to that agent.

Utilizing the preferred system and process described above, a customer can submit inventory collection records, telemarketing records and the like in the form, for example, of an inventory database, to the cross-enterprise system on a predetermined basis, such as a daily basis, and the cross-enterprise system initiates and monitors the calls made according to these records using the integrated system and process described above. The records include, for example, tags and/or treatments and/or target segments for who or what needs to be dialed, the best time of day to call, and what the customer wishes to be done with the called party when contacted. The inventory databases are submitted for processing at a predetermined interval, such as daily, so the cross-enterprise system runs the submitted inventory throughout the day and provides call data back to the customer at the end of the predetermined interval.

The cross-enterprise system uses pacing algorithms and submits records to be called through the dialing network. Upon identifying that a caller is on line or a right-party contact has been made, the cross-enterprise system applies treatments such as initiating a transfer from the dialing network to an agent at a site within the enterprise. The cross-enterprise system uses pre-routing and post-routing components and processes such as those offered by Cisco and PAR3 or other existing systems of the customer, enabling the customer to leverage current investments in existing call center systems in implementing the cross-enterprise system.

The above-described cross-enterprise system operating at the network level uses universal rules and functionality to initiate right-party contacts and in securing the right-party contact saves the data describing the type of call made, the identification of the party called, and the skills of the best agent available to connect to and then engage in the two-way call. The agent selection rules can be combined with inbound call routing to achieve "blended" agents for optimal productivity. Next, the cross-enterprise system initiates a trunk line release so it can make the port used to initiate the right-party contact available for the next dialing session to be initiated, while the previous contact between the customer and the collector or telemarketer remains in place.

Alternatively, the cross-enterprise system uses standard dialer treatments for those called parties who are not ultimately contacted in order to leave answering machine messages or detect ring, no answer. All of the call data and dispositions are collected and presented to the customer at the end of the predetermined interval, such as at the end of the day, so that the customer is able to update its internal systems, refresh the inventory database and send a subsequent inventory database the following day.

Figure 5:
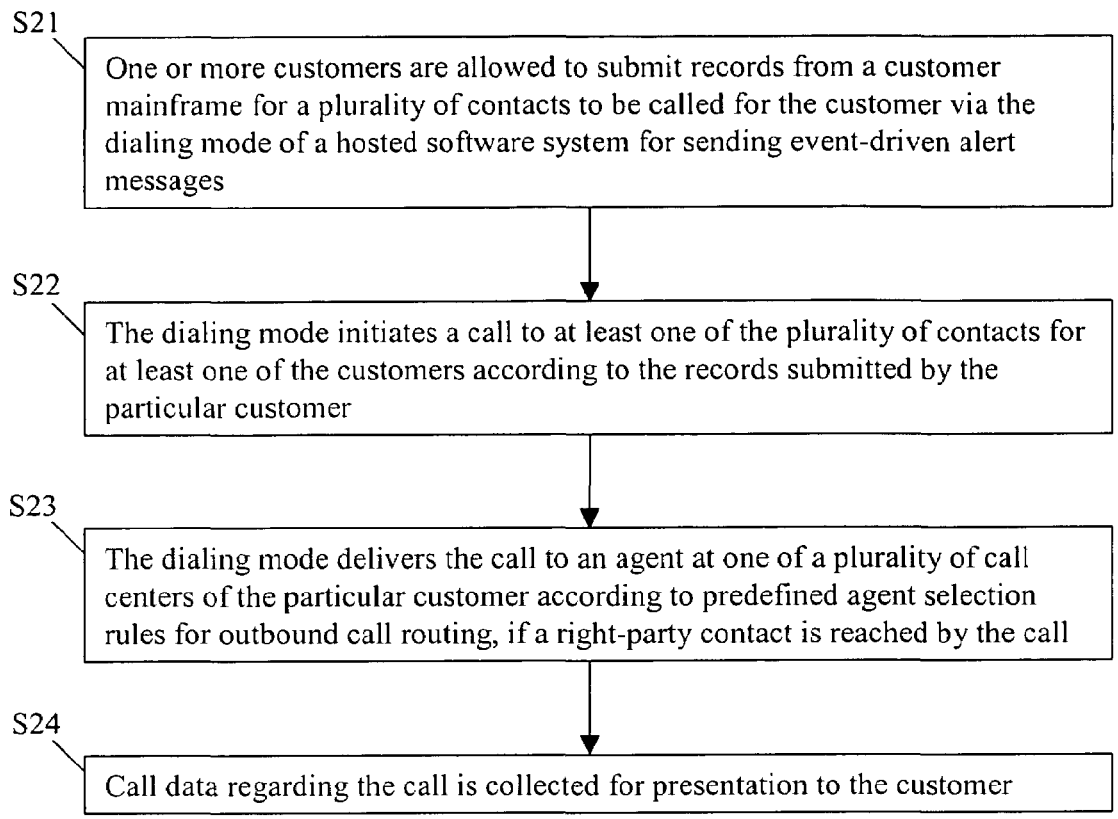
FIG. 5 is a flow chart which illustrates an overview example of the process of outbound dialing of contacts and call information collection for an embodiment of the present invention.

FIG. 5 is a flow chart which illustrates an example of the process of outbound dialing of contacts and call information collection for an embodiment of the present invention. Referring to FIG. 5, at S21, one or more customers are allowed to submit records from a customer mainframe for a plurality of contacts to be called for the customer via the dialing mode of a hosted software system for sending event-driven alert messages. At S22, the dialing mode initiates a call to at least one of the plurality of contacts for at least one of the customers according to the records submitted by the particular customer. At S23, the dialing mode delivers the call to an agent at one of a plurality of call centers of the particular customer according to predefined agent selection rules for outbound call routing, if a right-party contact is reached by the call. At S24, call data regarding the call is collected for presentation to the customer.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A method for outbound dialing of contacts and call information collection, comprising:
    allowing at least one customer to submit records from a customer mainframe for a plurality of contacts to be called for the customer via a dialing mode of a hosted software system for sending event-driven alert messages;
    initiating a call to at least one of the plurality of contacts for the at least one customer by the dialing mode of the hosted software system according to the records submitted by the customer;
    delivering the call from the dialing mode of the hosted software system to an agent at one of a plurality of call centers of the customer according to predefined agent selection rules for outbound call routing, if a right-party contact is reached by the call;
    collecting call data regarding the call to the at least one of the plurality of contacts by the dialing mode of the hosted software system according to the records submitted by the customer;
    wherein allowing the at least one customer to submit the records further comprises allowing the customer to submit the records including at least one of tags, treatments, and target segments of the contacts to be called and a time of day to call the contacts for the customer via the dialing mode; and
    wherein delivering the call to the agent further comprises selecting a routing script by a contact manager based on information in a number field dialed by the dialing mode of the hosted software system.

2. The method of claim 1, wherein allowing the at least one customer to submit the records further comprises allowing the customer to submit at least one of collection records and telemarketing records.

3. The method of claim 1, wherein allowing the at least one customer to submit the records further comprises allowing the customer to submit the records on a predetermined periodic basis.

4. The method of claim 1, wherein initiating the call by the dialing mode of the hosted software system further comprises initiating the call by a peripheral gateway through a telephony server of the hosted software system.

5. The method of claim 4, wherein initiating the call by the peripheral gateway further comprises initiating the call through an integrated services digital network utilizing B/D signaling via an access tandem switch and a public switched telephone network by the peripheral gateway.

6. The method of claim 5, wherein initiating the call by the peripheral gateway further comprises routing calling instructions for the call to the peripheral gateway by a contact manager.

7. The method of claim 1, wherein delivering the call to the agent further comprises examining a longest available agent at all of the plurality of call centers of the customer and determining a target vector directory number at said one of the plurality of call centers by the routing script.

8. The method of claim 7, wherein delivering the call to the agent further comprises selecting a free temporary vector directory number at said one of the plurality of call centers from a pool of vector directory numbers by an intelligent call router.

9. The method of claim 8, wherein delivering the call to the agent further comprises returning information about the free temporary vector directory number to an interactive voice response system by the intelligent call router.

10. The method of claim 1, wherein delivering the call to the agent further comprises determining a target agent for the call by the contact manager.

11. The method of claim 10, wherein delivering the call to the agent further comprises sending the call to a programmable device at said one of the plurality of call centers for routing incoming calls to target agents within said one of the plurality of call centers by the contact manager.

12. The method of claim 11, wherein sending the call to the programmable device further comprises sending the call to an automatic call distributor associated with the target agent by the contact manager.

13. The method of claim 12, wherein sending the call to the automatic call distributor further comprises routing the call to the target agent by the automatic call distributor as determined by an intelligent response platform.

14. The method of claim 1, wherein delivering the call to the agent further comprises providing call-event and profile information to a target agent desktop by the contact manager.

15. The method of claim 1, wherein delivering the call to the agent further comprises connecting the call to the agent for a two-way conversation with the right-party contact.

16. The method of claim 15, wherein connecting the call to the agent for the two-way conversation further comprises initiating a trunk line release of a port used to initiate the right-party contact for use in initiating a succeeding call to one of the plurality of contacts for the at least one customer by the dialing mode of the hosted software system without disturbing the connection between the right-party contact and the agent.

17. The method of claim 1, wherein delivering the call to the agent further comprises delivering the call to the agent according to predefined agent selection rules for outbound call routing combined with pre-defined agent selection rules based at least in part on agent availability and agent skills for inbound call routing.

18. The method of claim 1, wherein collecting the call data further comprises collecting call disposition data for presentation to the customer at the end of a predetermined interval.

19. The method of claim 18, wherein collecting the call disposition data further comprises providing call-back data to the customer at the end of the predetermined interval.

20. The method of claim 18, wherein collecting the call disposition data further comprises saving information consisting at least in part of a type of call made, an identification of the right-party contact, and skills of the agent.

21. The method of claim 1, further comprising formatting the records of the contacts to be called via the dialing mode for the customer according to a common set of rules and functionality by the hosted software system.

22. The method of claim 1, further comprising inventorying the records of the contacts to be called via the dialing mode for the customer by the hosted software system.

23. The method of claim 1, further comprising initiating and monitoring calls to the plurality of contacts at predetermined periodic intervals for the customer via the dialing mode of the hosted software system.

24. The method of claim 23, wherein initiating and monitoring the plurality of calls at predetermined periodic intervals further comprises initiating and monitoring the plurality of calls via the dialing mode of the hosted software system using a pacing algorithm.

25. A system for outbound dialing of contacts and call information collection, comprising:
   means for receiving records from a customer mainframe for a plurality of contacts to be called for at least one customer via a dialing mode of a hosted software system adapted for sending event-driven alert messages;
   the dialing mode of the hosted software system being further adapted for initiating a call to at least one of the plurality of contacts for the at least one customer according to the records submitted by the customer;
   means for delivering the call from the dialing mode of the hosted software system to an agent at one of a plurality of call centers of the customer according to predefined agent selection rules for outbound call routing, if a right-party contact is reached by the call;
   means for collecting call data regarding the call to the at least one of the plurality of contacts by the dialing mode of the hosted software system according to the records submitted by the customer;
   wherein said means for receiving the records further comprises means for receiving records including at least one of tags. treatments, and target segments of the contacts to be called and a time of day to call the contacts for the customer via the dialing mode; and
   wherein said means for delivering the call to the agent further comprises means for selecting a routing script by a contact manager based on information in a number field dialed by the dialing mode of the hosted software system.

26. A method for outbound dialing of contacts and call information collection, comprising:
   allowing at least one customer to submit records from a customer mainframe for a plurality of contacts to be called for the customer via a dialing mode of a hosted software system for sending event-driven alert messages;
   initiating a call to at least one of the plurality of contacts for the at least one customer by the dialing mode of the hosted software system according to the records submitted by the customer;
   delivering the call from the dialing mode of the hosted software system to an agent at one of a plurality of call centers of the customer according to predefined agent selection rules for outbound call routing, if a right-party contact is reached by the call;
   collecting call data regarding the call to the at least one of the plurality of contacts by the dialing mode of the hosted software system according to the records submitted by the customer; and
   wherein allowing the at least one customer to submit the records further comprises allowing the customer to submit the records including at least one of tags, treatments, and target segments of the contacts to be called and a time of day to call the contacts for the customer via the dialing mode.

* * * * *

UNITED STATES PATENT AND TRADEMARK OFFICE
CERTIFICATE OF CORRECTION

PATENT NO. : 7,248,687 B2  
APPLICATION NO. : 11/005641  
DATED : July 24, 2007  
INVENTOR(S) : Mark Ambrose et al.

Page 1 of 1

It is certified that error appears in the above-identified patent and that said Letters Patent is hereby corrected as shown below:

ON TITLE PAGE IN THE REFERENCES CITED ITEM (56) -

Please add the following references under U.S. PATENT DOCUMENTS -

| | | | |
|---|---|---|---|
| 6,163,607 | 12/19/00 | Bogart, et al. | 379/266 |
| 6,137,870 | 10/24/00 | Scherer | 379/127 |
| 5,987,115 | 11/16/99 | Petrunka, et al. | 379/265 |
| 5,937,051 | 8/10/99 | Hurd, et al. | 379/212 |
| 5,915,010 | 6/22/99 | McCalmont | 379/212 |
| 5,901,209 | 5/4/99 | Tannenbaum, et al. | 379/142 |
| 5,884,032 | 3/16/99 | Bateman, et al. | 395/200.34 |
| 5,867,562 | 2/2/99 | Scherer | 379/88 |
| 5,696,809 | 12/9/97 | Voit | 379/5 |
| 5,206,903 | 4/27/93 | Kohler, et al. | 379/309 |
| 5,008,930 | 4/16/91 | Gawrys, et al. | 379/210 |

Please add the following references under OTHER PUBLICATIONS - Item 56

"Products and Platforms - Intelligent Contact Management Solutions" [online], Copyright 1992-2002 [retrieved on December 4, 2003], 4 pp. Retrieved from the Internet: http://www.cisco.com/warp/public/180/prod_plat/cust_cont/icm "PAR3 Intelligent Response Platform" [online], Copyright 2000 (retrieved on or about December 4, 2003), 4 pp., Retrieved from the Internet: http://www.par3.com/sales/PAR3_FactsFeatures.pdf Signed and Sealed this Sixteenth Day of October, 2007

JON W. DUDAS  
*Director of the United States Patent and Trademark Office*